United States Patent [19]

Sugimoto et al.

[11] Patent Number: 5,977,259
[45] Date of Patent: Nov. 2, 1999

[54] THERMOPLASTIC ELASTOMER COMPOSITION AND MOLDED ARTICLE COMPRISING THE SAME

[75] Inventors: Hiroyuki Sugimoto, Yasu-gun; Yoshihiro Nakatsuji, Toyonaka; Satoru Moritomi; Shinichiro Nagai, both of Sodegaura; Yuji Gotoh, Chiba, all of Japan

[73] Assignee: Sumitomo Chemical Company, Ltd., Osaka, Japan

[21] Appl. No.: 08/981,244

[22] PCT Filed: Jun. 19, 1996

[86] PCT No.: PCT/JP96/01687

§ 371 Date: Dec. 22, 1997

§ 102(e) Date: Dec. 22, 1997

[87] PCT Pub. No.: WO97/00911

PCT Pub. Date: Jan. 9, 1997

[30] Foreign Application Priority Data

Jun. 20, 1995 [JP] Japan ................................. 7-153252
May 15, 1996 [JP] Japan ................................. 8-120351

[51] Int. Cl.$^6$ .............................. C08L 23/16; C08L 9/00
[52] U.S. Cl. ......................... 525/232; 525/193; 525/194
[58] Field of Search .................................. 525/232, 193, 525/194

[56] References Cited

U.S. PATENT DOCUMENTS 4,745,149  5/1988  Eisele et al. .

FOREIGN PATENT DOCUMENTS

| 479 580 | 4/1992 | European Pat. Off. . |
| 482778 | 4/1992 | European Pat. Off. . |
| 2-36244 | 2/1990 | Japan . |
| 5-179100 | 7/1993 | Japan . |
| 5-320442 | 12/1993 | Japan . |
| 7-82433 | 3/1995 | Japan . |

OTHER PUBLICATIONS

Database WPI, Section Ch, Week 9523, Derwent Publications Ltd., London, GB; Class A18, AN 95–175069, XP002073354 & JP 07 096 529 A (Mitsui Petrochem Ind.Co. Ltd), 1995.
Patent Abstracts of Japan, vol. 095, No. 009, Oct. 31, 1995 & JP 07 145278 A (Okamoto Ind Inc.), Jun. 6, 1995.
The Polymer Dictionary (p. 421, Asakura Shoten Ltd., $2^{nd}$ edition 1989).

*Primary Examiner*—David Buttner
*Attorney, Agent, or Firm*—Pillsbury Madison & Sutro LLP

[57] ABSTRACT

A thermoplastic elastomer composition containing 100 wt. parts, in total, of an ethylene-α-olefin copolymer rubber and a polyolefin resin, and 0.1 to 150 wt. parts of at least one hydrogenated diene polymer having a hydrogenation degree of at least 70% selected from the group consisting of hydrogenated conjugated diene polymers and hydrogenated products of random copolymers comprising conjugated dienes and aromatic vinyl compounds in which the content of the aromatic vinyl compound units is 25 wt. % or less, in which the composition has a complex dynamic viscosity $\eta^*(1)$ of $1.5 \times 10^5$ poise or less, and a Newtonian viscosity index n of 0.67 or less. This composition provides molded articles which are not whitened on bending, and has good flexibility.

4 Claims, No Drawings

5,977,259

THERMOPLASTIC ELASTOMER COMPOSITION AND MOLDED ARTICLE COMPRISING THE SAME

FIELD OF THE INVENTION

The present invention relates to a thermoplastic elastomer composition and a molded article comprising the same.

PRIOR ART

Molded articles having complicated patterns such as leather grains or stitches are used as skin materials of interior parts of automobiles, and molded articles made of compositions comprising vinyl chloride resins are widely used as the skin materials. However, the molded articles of the vinyl chloride resins generate hydrogen chloride gas and the like when they are incinerated after the use, and thus require specially designed incinerators.

To solve such problems, thermoplastic elastomer molded articles comprising an ethylene-α-olefin copolymer rubber and a polyolefin resin are proposed (EP-A-479 580 and EP-A-482 778). However, the thermoplastic elastomer molded articles are more easily whitened on bending than the vinyl chloride resin molded articles. Thus, the molded articles tend to have poor appearance since they are whitened at portions which have been bent when they are released from a mold after their production, or they are preformed in desired shapes. Furthermore, the thermoplastic elastomer molded articles doesn't have enough flexibility and poor feeling when touched.

SUMMARY OF THE INVENTION

An object of the present invention is to provide a thermoplastic elastomer composition which provides a molded article that is not easily whitened on bending and has good flexibility.

Another object of the present invention is to provide a molded article of a thermoplastic resin composition, which is not easily whitened on bending and has good flexibility.

According to the first aspect, the present invention provides a thermoplastic elastomer composition comprising:

100 wt. parts, in total, of an ethylene-α-olefin copolymer rubber and a polyolefin resin, and 0.1 to 150 wt. parts of at least one hydrogenated diene polymer having a hydrogenation degree of at least 70% selected from the group consisting of hydrogenated conjugated diene polymers and hydrogenated products of random copolymers comprising conjugated dienes and aromatic vinyl compounds in which the content of the aromatic vinyl compound units is 25 wt. % or less, wherein said composition has a complex dynamic viscosity $\eta^*(1)$ of $1.5 \times 10^5$ poise or less, and a Newtonian viscosity index n of 0.67 or less.

According to the second aspect, the present invention provides a molded article comprising the above thermoplastic elastomer composition according to the present invention.

According to the third aspect, the present invention provides a molded article produced by powder molding the powder of the above thermoplastic elastomer composition according to the present invention.

According to the fourth aspect, the present invention provides a method for producing a molded article comprising powder molding the powder of the above thermoplastic elastomer composition according to the present invention.

DETAILED DESCRIPTION OF THE INVENTION

The ethylene-α-olefin copolymer rubbers contained in the thermoplastic elastomer composition of the present invention are amorphous copolymers obtained by copolymerizing ethylene and an α-olefin as essential monomers, and optionally other polymerizable monomer such as a non-conjugated diene.

Examples of the α-olefins are α-olefins having 3 to 10 carbon atoms such as propylene, 1-butene, 3-methyl-1-butene, and the like. Examples of the non-conjugated diene are those having 5 to 15 carbon atoms such as dicyclopentadiene, ethylidenenorbornene, 1,4-hexadiene, cycloocatadiene, methylenenorbornene, and the like.

Examples of the ethylene-α-olefin copolymer rubbers are ethylene-propylene copolymer rubbers, ethylene-propylene-ethylidenenorbornene copolymer rubbers (hereinafter referred to as "EPDM") and the like. Among them, EPDM is preferable since it can give a thermoplastic elastomer composition which provides molded articles having good heat resistance, tensile properties, and the like.

The ethylene-α-olefin copolymer rubbers may be crosslinked. The crosslinking can be carried out by any known method.

The polyolefin resins mean crystallizable polymers comprising at least one olefin.

Examples of the olefins are those having 2 to 8 carbon atoms such as ethylene, propylene, butene, and the like.

Examples of the polyolefin resins are polypropylene, propylene-ethylene copolymers, copolymers of propylene and an α-olefin other than propylene (e.g. butene), and the like. Among them, the propylene-ethylene copolymers are preferable since they can give the thermoplastic elastomer compositions which provide molded articles having good heat resistance.

The polyolefin resins may be crosslinked. Also, the crosslinking of the polyolefin resins can be carried out by any known method.

When molded articles are produced using the powder of the thermoplastic elastomer composition of the present invention by the below described powder molding method, the melt flow rate (measured according to JIS K-7210 at 230° C. under the load of 2.16 kg; hereinafter referred to as "MFR") of the polyolefin resins is preferably at least 20 g/10 min., more preferably at least 50 g/10 min.

The hydrogenated diene polymers used in the present invention can be obtained by hydrogenating conjugated diene polymers or random copolymers comprising a diene and an aromatic vinyl compound.

The conjugated diene polymers mean polymers obtained by polymerizing at least one conjugated diene. Examples of the conjugated dienes are those having 4 to 8 carbon atoms such as butadiene, isoprene, pentadiene, 2,3-dimethylbutadiene, and the like.

Examples of the conjugated diene polymers are polybutadiene, polyisoprene, polypentadiene, and the like.

The random copolymers comprising the diene and aromatic vinyl compound mean random copolymers of a conjugated diene as described above, and at least one aromatic vinyl compound.

The aromatic vinyl compounds may be substituted with an alkyl group such as a methyl group at the 1- or 2-position of the vinyl group. Examples of the aromatic vinyl compounds are those having 8 to 12 carbon atoms such as styrene, p-methylstyrene, α-methylstyrene, and the like.

Examples of the random copolymers comprising the diene and aromatic vinyl compound are random copolymers of butadiene and styrene, random copolymers of isoprene and styrene, random copolymers of butadiene and p-methylstyrene, and the like.

The content of the aromatic vinyl compound units in the random copolymers comprising the diene and aromatic vinyl compound is generally 25 wt. % or less, preferably 20 wt. % or less. When this content exceeds 25 wt. %, molded articles obtained by molding the thermoplastic elastomer compositions tend to be easily whitened on bending.

The conjugated diene units in the conjugated diene polymers or random copolymers comprising the diene and aromatic vinyl compound include conjugated diene units having an olefinic unsaturated bond in a side chain, and conjugated diene units having an olefinic unsaturated bond in the backbone, depending on the polymerization sites of the conjugated dienes. The percentage of the number of the conjugated diene units having the olefinic unsaturated bond in the side chain is between 5 to 95%, preferably between 30 and 95%, more preferably between 40 and 90%, of the number of all the conjugated diene units.

The conjugated diene polymers or random copolymers comprising the diene and aromatic vinyl compound may be easily prepared by any known method. For example, the conjugated diene polymers can be prepared by polymerizing a conjugated diene in a hydrocarbon solvent through a living anionic polymerization, and the random copolymers comprising the diene and aromatic vinyl compound can be prepared by polymerizing a conjugated diene and an aromatic vinyl compound through a living anionic polymerization (see, for example, JP-A-2-36244).

In the living anionic polymerization, polymerization initiators such as organic lithium compounds are usually used. Examples of the organic lithium compounds are alkyllithium such as n-butyllithium, sec.-butyllithium, tert.-butyllithium, and the like.

Examples of the hydrocarbon solvents are aliphatic hydrocarbons such as hexane, heptane, etc.; alicyclic hydrocarbons such as methylcyclopentane, cyclohexane, etc.; aromatic hydrocarbons such as benzene, toluene, xylene, etc.; unsaturated aliphatic hydrocarbons such as 2-methylbutene-1,2-methylbutene-2, etc.; and the like.

The living anionic polymerization can be carried out in a batch or continuous manner. The polymerization temperature is usually between 0 and 120° C.

The percentage of the number of the conjugated diene units having the olefinic unsaturated bonds in the side chains based on the total number of the conjugated diene units can be easily controlled by using ethers; tertiary amines; alkoxides, phenoxides or sulfonate salts of alkali metals (e.g. sodium, potassium, etc.); or the like and adequately selecting their kinds and amounts in the living anionic polymerization.

Furthermore, the molecular weights of the polymers can be increased by the addition of polyfunctional coupling agents or crosslinking agents just before the termination of polymerization.

Examples of the coupling agents are tetrachlorosilicon, butyltrichlorosilicon, tetrachlorotin, butyltrichlorotin, tetrachlorogermanium, bis(trichlorosilyl)ethane, and the like, and examples of the crosslinking agents are divinylbenzene, diesters of adipic acid, epoxidized liquid butadiene, epoxidized soybean oil, epoxidized linseed oil, tolylene diisocyanate, diphenylmethane diisocyanate, 1,2,4-benzene triisocyanate, and the like.

The conjugated diene polymers or random copolymers comprising the diene and aromatic vinyl compound can be hydrogenated by reacting the polymers with hydrogen in hydrocarbon solvents in the presence of hydrogenation catalysts under a hydrogen pressure of 1 to 100 kg/cm$^2$ at a temperature of 20 to 150° C. (see, for example, JP-A-2-36244).

Examples of the hydrogenation catalysts are catalysts comprising noble metals (e.g. palladium, ruthenium, rhodium, platinum, etc.) supported on carriers (e.g. silica, carbon, diatomaceous earth, etc.), complexes of noble metals (e.g. palladium, ruthenium, rhodium, platinum, etc.), catalysts comprising organic carboxylate salts of cobalt or nickel, and organic aluminum or lithium compounds, catalysts comprising titanium compounds (e.g. dicyclopentadienyltitanium dichloride, dicyclopentadienyldiphenyltitanium, dicyclopentadienyltitanium ditolyl, dicyclopentadienyltitanium dibenzyl, etc.) and organic metal compounds of lithium, aluminum, magnesium, etc., and the like.

The above hydrogenation process hydrogenates the olefinic unsaturated bonds in the side chains or backbones of the conjugated diene polymers or random copolymers comprising the diene and aromatic vinyl compound, and thus the hydrogenated diene polymers used in the present invention are obtained. The hydrogenation degree of the hydrogenated diene polymers should be at least 70%.

Herein, the hydrogenation degree means the percentage of the hydrogenated olefinic unsaturated bonds based on the number of the olefinic unsaturated bonds in the side chains or backbones before hydrogenation.

The hydrogenation degree is preferably at least 90%, more preferably at least 95%.

The hydrogenated diene polymers may be crosslinked. The hydrogenated diene polymers can be crosslinked by any known method.

The thermoplastic elastomer composition of the present invention contains 0.1 to 150 wt. parts of the hydrogenated diene polymer per 100 wt. parts of the total amount of the ethylene-α-olefin copolymer rubber and polyolefin resin. Preferably, the amount of the hydrogenated diene polymer is between 3 and 100 wt. parts, when the ethylene-α-olefin copolymer rubbers are not crosslinked, or between 3 and 50 wt. parts when the ethylene-α-olefin copolymer rubbers are crosslinked. When the amount of the hydrogenated diene polymer is less than 0.1 wt. part, the compositions have the low flexibility and thus tend to provide molded articles which are easily whitened on bending. When the amount of the hydrogenated diene polymer exceeds 150 wt. parts, the compositions tend to provide molded articles having tackiness.

The weight ratio of the ethylene-α-olefin copolymer rubbers to the polyolefin resins is usually between 5:95 and 80:20.

The thermoplastic elastomer compositions of the present invention may be prepared, for example, by kneading the ethylene-α-olefin copolymer rubbers, polyolefin resins, and hydrogenated diene polymers. Alternatively, the hydrogenated diene polymers may be added to the beforehand prepared mixture of the ethylene-α-olefin copolymer rubbers and polyolefin resins, and then kneaded.

When the ethylene-α-olefin copolymer rubbers are to be crosslinked, the uncrosslinked ethylene-α-olefin copolymer rubbers and polyolefin resins are kneaded and then dynamic crosslinked with the addition of the crosslinking agents, and thereafter the hydrogenated diene copolymers are added, and the mixture is kneaded. Alternatively, the uncrosslinked ethylene-α-olefin copolymer rubbers, polyolefin resins and hydrogenated diene polymers are kneaded, and then dynamic crosslinked with the addition of the crosslinking agents.

Examples of the crosslinking agents are organic peroxides such as dialkylperoxides (e.g. 2,5-dimethyl-2,5-di(tert.-butylperoxy)hexane, etc.). The amount of the crosslinking agents is usually 1 wt. part or less, preferably 0.8 wt. part or less, per 100 wt. parts of the total amount of the ethylene-α-olefin copolymer rubbers and polyolefin resins.

The ethylene-α-olefin copolymer rubbers are suitably crosslinked by the dynamic crosslinking with the crosslinking agents in the presence of crosslinking aids, and the thermoplastic elastomer compositions having good heat resistance and melt flow properties can be obtained.

Examples of the crosslinking aids are bismaleimide compounds. The amount of the crosslinking aids is usually 1.5 wt. parts or less, preferably 0.8 wt. part or less per 100 wt. parts of the total amount of the ethylene-α-olefin copolymer rubbers and polyolefin resins.

When the crosslinking aids are used, the amount of the crosslinking agents is usually 0.8 wt. part or less, preferably 0.6 wt. part of less per 100 wt. parts of the total amount of the ethylene-α-olefin copolymer rubbers and polyolefin resins.

For dynamic crosslinking, continuous kneading apparatuses such as single or twin screw kneaders can be used, and the mixture is kneaded while heating, for example, at a temperature in the range between 150 and 250° C.

The ethylene-α-olefin copolymer rubbers are preferentially crosslinked by the dynamic crosslinking. The polyolefin resins may be crosslinked. Furthermore, the hydrogenated diene polymers may be crosslinked, when the ethylene-α-olefin copolymer rubbers, polyolefin resins and hydrogenated polymers are kneaded and then dynamic crosslinked.

The thermoplastic elastomer compositions of the present invention may contain additives such as mineral oil base softeners; phenol, sulfite, phenylalkane, phosphite, amine or amide base heat stabilizers; anti-aging agents; weathering agents; antistatic agents; lubricants such as metal soaps, waxes, etc.; internal mold release agents; pigments for coloring; and the like. The additives may be contained in the ethylene-α-olefin copolymer rubbers, polyolefin resins or hydrogenated polymers, or compounded during the above kneading or dynamic crosslinking, or the post-kneading.

Among the additives, the mineral oil base softeners are preferably used, since the thermoplastic elastomer compositions containing them have good melt flowability, and the obtained molded articles have good flexibility. The use of the ethylene-α-olefin copolymer rubbers containing the mineral oil base softeners, that is, oil-extended olefinic copolymer rubbers, facilitates the above kneading and dynamic crosslinking.

The thermoplastic elastomer compositions of the present invention should have a complex dynamic viscosity $\eta^*(1)$ of $1.5 \times 10^5$ poise or less, preferably $1 \times 10^5$ poise or less, more preferably $1 \times 10^4$ poise or less, when measured at a temperature of 250° C. and a frequency ω of 1 radian/sec.

Herein, the complex dynamic viscosity $\eta^*(\omega)$ is calculated according to the equation (1):

$$\eta^*(\omega) = \{[G'(\omega)]^2 + [G''(\omega)]^2\}^{1/2}/\omega \quad (1)$$

wherein $G'(\omega)$ and $G''(\omega)$ are a storage viscoelasticity and a loss viscoelasticity, respectively at a temperature of 250° C. and a frequency ω.

When $\eta^*(1)$ exceeds $1.5 \times 10^5$ poise, the melt flowability of the thermoplastic elastomer composition decreases, and thus it is difficult to produce molded articles by molding methods in which a shear rate during molding is 1 sec.$^{-1}$ or less, such as powder molding methods.

The thermoplastic elastomer composition of the present invention should have a Newtonian viscosity index n of 0.67 or less, preferably 0.6 or less.

Herein, the Newtonian viscosity index n is calculated according to the equation (2):

$$n = \{log\ \eta^*(1) - log\ \eta^*(100)\}/2 \quad (2)$$

wherein $\eta^*(100)$ is a complex dynamic viscosity measured at a temperature of 250° C. and a frequency ω of 100 radian/sec.

When the Newtonian viscosity index n exceeds 0.67, the mechanical strength of the produced molded articles tends to decrease.

Thermoplastic elastomer compositions of the present invention which satisfy the above physical properties expressed by the complex dynamic viscosity and Newtonian viscosity index can be prepared by suitably selecting the degrees of the kneading and dynamic crosslinking, the kinds and amounts of the components which constitute the thermoplastic elastomer compositions, the kinds and amounts of the crosslinking agents and/or crosslinking aids used in the dynamic crosslinking; the kinds and amounts of the additives; and the like. Among them, the shear rate during the kneading and dynamic crosslinking has large influences on the above physical properties. It is preferable to knead and dynamic crosslink the mixture at a shear rate of at least $1 \times 10^3$ sec.$^{-1}$.

Molded articles can be easily produced by molding the thermoplastic elastomer compositions of the present invention. A typical example of the molding method is powder molding of the powder of the thermoplastic elastomer composition.

The powders of the thermoplastic elastomer compositions can be produced by, for example, a freeze-grinding method comprising the steps of cooling the thermoplastic elastomer compositions to their glass transition temperature or less, preferably −70° C. or less, more preferably −90° C. or less, and grinding the compositions while maintaining the cooled state. When the thermoplastic elastomer compositions are ground at a temperature higher than their glass transition temperature, the particle sizes of the obtained powders become less uniform, and thus, it may be difficult to carry out the powder molding. For the grinding of the thermoplastic elastomer compositions while maintaining the cooled state, it is preferable to employ grinding methods which generate less heat, for example, mechanical grinding methods using impact grinders such as ball mills.

The powders of the thermoplastic elastomer compositions have a particle size which passes through the 24 mesh (opening: 700 μm×700 μm) of the Tyler standard sieve, preferably through the 28 mesh (opening: 590 μm×590 μm).

The obtained powders of the thermoplastic elastomer compositions are preferably used in the powder molding since they can be easily molten by the heat supplied from molds even at a low shear rate and under low molding pressure.

The powder molding methods include a fluidized bed dip coating method, an electrostatic coating method, a powder spray coating method, a rotational powder molding method, a powder slush molding method, and the like.

For example, the powders of the thermoplastic elastomer compositions may be powder molded as follows:

A mold which may have complicated designs on its molding surface is heated to a temperature higher than the melt temperature of the thermoplastic elastomer composition. Then, the powder of the thermoplastic elastomer composition is supplied on the molding surface of the mold, and the powder particles are fused together to form a sheet form melt on the molding surface. After that, the excessive portion of the powder which is not fused is recovered. The mold may be further heated after the recovery of the powder. Thereafter, the mold is cooled and the article is released from the mold to obtain the desired molded article.

The heating methods of the molds include a gas heating furnace method, a heat transfer medium-circulation method, a dipping method in a heat transfer medium or hot fluidizing sand, a radiofrequency induction heating method, and the like.

The mold temperature for fusing the powder onto the mold is usually between 150 and 300° C., preferably between 190 and 270° C. A time from the supply of the powder onto the molding surface of the mold to the recovery of the powder is not limited, and may be determined according to the sizes and thicknesses of the articles to be molded.

The obtained molded articles are not whitened on bending during the release from the mold, and have good flexibility.

EFFECTS OF THE INVENTION

The thermoplastic elastomer composition of the present invention provides molded articles which are not whitened on bending during the release from the mold, and have good flexibility.

EXAMPLES

The present invention will be illustrated by the following examples, which do not limit the scope of the present invention in any way.

The thermoplastic elastomer compositions and molded articles were evaluated as follows:

[1] Complex dynamic viscosity $\eta^*(1)$ and Newtonian viscosity index n

A storage viscoelasticity $G'(\omega)$ and a loss viscoelasticity $G''(\omega)$ were measured at a frequency $\omega$ of 1 radian/sec. or 100 radian/sec. using a dynamic analyzer (RDS-7700 manufactured by Rheometrix), and complex dynamic viscosities $\eta^*(1)$ and $\eta^*(100)$ were calculated, respectively, according to the above equation (1).

The measurements were carried out with a parallel plate mode, at an applied strain of 5% and a sample temperature of 250° C.

A newtonian viscosity index n was calculated from $\eta^*(1)$ and $\eta^*(100)$ according to the above equation (2).

[2] Flexibility of molded articles

A molded article having a thickness of 1 mm was cut to a piece of 1 cm×5 cm, and ten pieces were laminated. Then, Shore A hardness of the laminate was measured according to JIS K-6301.

[3] Whitening on bending

A molded article having a thickness of 1 mm was cut to a piece of 1 cm×5 cm, and bent under a load of 500 g or 1 kg. After one minute, the load was removed, and the width of whitened portion was measured and ranked according to the following criteria:

1: Width of the whitened portion being 2 mm or more.
2. Width of the whitened portion being 1 mm or more but less than 2 mm.
3. Width of the whitened portion being less than 1 mm.
4. No whitened portion.

Reference Example 1

An oil-extended EPDM (50 wt. parts), which comprises 100 wt. parts of EPDM (content of propylene units=28 wt. %; iodine value=12) and 100 wt. parts of a mineral oil base softener (DIANAPROCES PW-380 manufactured by IDEMITSU KOSAN Co., Ltd.), a propylene-ethylene random copolymer resin (content of ethylene units=5 wt. %; MFR= 90 g/10 min.) (50 wt. parts), and a crosslinking agent (SUMIFINE BM, a bismaleimide compound manufactured by Sumitomo Chemical Co., Ltd.) (0.4 wt. parts) were kneaded with a Banbury mixer for 10 minutes, and pelletized with an extruder, and a master batch was obtained.

To the master batch (100 wt. parts), an organic peroxide (SANPEROX APO, 2,5-dimethyl-2,5-di(tert.-butylperoxy) hexane manufactured by SANKEN KAKO KABUSHIKIKAISHA) (0.1 wt. part) was added, and the mixture was dynamic crosslinked with a twin-screw extruder (TEX-44 manufactured by NIPPON SEIKOSHO) at 220° C., and a composition ($\eta^*(1)=5.2\times10^3$ poise; n=0.31) was obtained and cut with a cutter. Thus, pellets were obtained.

Example 1

The pellets obtained in Reference Example 1 (100 wt. parts) and a hydrogenated diene polymer (DYNARON 1320P, hydrogenated butadiene-styrene random copolymer manufactured by NIPPON SYNTHETIC RUBBER Co., Ltd. content of styrene unit=10 wt. %; hydrogenation degree=99%; $\eta^*(1)=2.1\times10^4$ poise; n=0.23) (5 wt. parts) were melt kneaded with a 40 mm$\phi$ extruder at 180° C., and a thermoplastic elastomer composition was obtained. Then, the composition was cut with a cutter, and pellets were obtained.

The pellets were cooled to −120° C. with liquid nitrogen, and ground while maintaining the cooled state, and the powder of the thermoplastic elastomer composition (passing the 32 mesh (opening: 500 $\mu$m×500 $\mu$m) of the Tyler standard sieve) was obtained.

The powder of the thermoplastic elastomer composition (1000 g) was supplied onto a molding surface of a nickel electroforming grain board (30 cm×30 cm, thickness of 3 mm) which had been heated to a surface temperature of 250° C., and unfused excessive powder was removed from the board after 14 seconds.

Then, the board carrying the fused powder was heated in a furnace kept at 250° C. for 60 seconds, followed by cooling, and an article was released from the board. A sheet-form molded article having a thickness of 1 mm was obtained. The results of the evaluations of the thermoplastic elastomer composition and molded article are shown in Table 1.

Examples 2–5 and Comparative Examples 1–2

A thermoplastic elastomer composition was prepared, and a molded article was produced in the same manners as in Example 1 except that the amount of the hydrogenated diene polymer was changed as shown in Table 1. The results of the evaluations of the thermoplastic elastomer composition and molded article are shown in Table 1.

Example 6

To the master batch obtained in Reference Example 1 (100 wt. parts), an organic peroxide (SANPEROX APO, 2,5-dimethyl-2,5-di(tert.-butylperoxy)hexane manufactured by SANKEN KAKO KABUSHIKIKAISHA) (0.1 wt. part) and a hydrogenated diene polymer (DYNARON 1320P) (5 wt. parts) were added, and the mixture was dynamic crosslinked with a twin-screw extruder (TEX-44 manufactured by The Japan Steel Works, Ltd.) at 220° C., and a composition $\eta^*(1)=4.0\times10^3$ poise; n=0.31) was obtained and cut with a cutter. Thus, pellets were obtained.

The pellets were cooled to −120° C. with liquid nitrogen, and ground while maintaining the cooled state, and the powder of the thermoplastic elastomer composition (passing the 32 mesh of the Tyler standard sieve) was obtained.

Then, a molded article was produced in the same manner as in Example 1 except that the above obtained powder of the thermoplastic elastomer composition was used in place of the powder of the thermoplastic elastomer composition obtained in Example 1.

The results of the evaluations of the thermoplastic elastomer composition and molded article are shown in Table 1.

Comparative Examples 3 and 4

A thermoplastic elastomer composition was prepared, and a molded article was produced in the same manners as in Example 1 except that an ethylene-propylene random copolymer (SPO V0141 manufactured by Sumitomo Chemical Co., Ltd. content of propylene units=27 wt. %; $\eta^*(1)=5.2\times10^4$ poise; n=0.2) (20 wt. parts) and a styrene-butadiene random copolymer (SBR 1502 manufactured by Sumitomo Chemical Co., Ltd. content of styrene units=23 wt. %; $\eta^*(1)=3.1\times10^5$ poise; n=0.62) (20 wt. parts) were used. The results of the evaluations of the thermoplastic elastomer composition and molded article are shown in Table 1.

TABLE 1

| Example No. | Hydrogenated diene copolymer | Thermoplastic elastomer composition $\eta^*$ (1) (poise) | n | Molded article Flexi-bility | Whitening under 500 g | 1 kg |
| --- | --- | --- | --- | --- | --- | --- |
| Ex. 1 | 5 | $4.4 \times 10^3$ | 0.23 | 89 | 4 | 3 |
| Ex. 2 | 10 | $3.7 \times 10^3$ | 0.20 | 88 | 4 | 4 |
| Ex. 3 | 20 | $2.5 \times 10^3$ | 0.10 | 86 | 4 | 4 |
| Ex. 4 | 40 | $4.5 \times 10^3$ | 0.14 | 82 | 4 | 4 |
| Ex. 5 | 80 | $6.5 \times 10^3$ | 0.15 | 80 | 4 | 4 |
| Ex. 6 | 5 | $4.0 \times 10^3$ | 0.25 | 89 | 3 | 3 |
| C. Ex. 1 | 0 | $5.2 \times 10^3$ | 0.31 | 92 | 2 | 2 |
| C. Ex. 2 | 0.05 | $5.1 \times 10^3$ | 0.31 | 92 | 2 | 2 |
| C. Ex. 3 | (SPO V0141) | $2.6 \times 10^4$ | 0.38 | 88 | 1 | 1 |
| C. Ex. 4 | (SBR 1052) | $1.5 \times 10^4$ | 0.42 | 88 | 1 | 1 |

Comparative Examples 5–9

A thermoplastic elastomer composition was prepared, and a molded article was produced in the same manners as in Example 1 except that, in place of the hydrogenated diene polymer (DYNARON 1320P), a hydrogenated butadiene-styrene random copolymer (DYNARON 1910P manufactured by NIPPON SYNTHETIC RUBBER Co., Ltd. content of styrene units=30 wt. %; hydrogenation degree=99%; $\eta^*(1)=8.4\times10^3$ poise; n=0.12) (20 wt. parts); a hydrogenated styrene-butadiene-styrene block copolymer (KRAYTON G1657X manufactured by SHELL CHEMICAL Co., Ltd. content of styrene units=13wt. %; hydrogenation degree= 99%; $\eta^*(1)=7\times10^3$ poise; n=0.1) (20 wt. parts); a hydrogenated styrene-isoprene- styrene block copolymer (SEPTON 2043 manufactured by KURARAY Co., Ltd. content of styrene units=20 wt. %; hydrogenation degree=99%; $\eta^*(1)=1.3\times10^3$ poise; n=0.63) (20 wt. parts); a styrene-butadiene-crystalline polyethylene block copolymer (DYNARON E4600P manufactured by NIPPON SYNTHETIC RUBBER Co., Ltd. content of styrene units=20wt. %; hydrogenation degree=99%; $\eta^*(1)=7.2\times10^3$ poise; n=0.21) (20 wt. parts); or a crystalline polyethylene-butadiene-crystalline polyethylene block copolymer (DYNARON E6100P manufactured by NIPPON SYNTHETIC RUBBER Co., Ltd. hydrogenation degree=99%; $\eta^*(1)=7.2\times10^3$ poise; n=0.21) was used, respectively. The results of the evaluations of the thermoplastic elastomer composition and molded article are shown in Table 2.

TABLE 2

| Example No. | Polymer | Thermoplastic elastomer composition $\eta^*$ (1) (poise) | n | Molded article Flexi-bility | Whitening under 500 g | 1 kg |
| --- | --- | --- | --- | --- | --- | --- |
| C. Ex. 5 | DYNARON 1910P | $1.1 \times 10^4$ | 0.34 | 88 | 1 | 1 |
| C. Ex. 6 | KRAYTON G1657X | $1.0 \times 10^4$ | 0.34 | 88 | 1 | 1 |
| C. Ex. 7 | HYBLAR HVS-3 | $1.2 \times 10^4$ | 0.44 | 88 | 1 | 1 |
| C. Ex. 8 | pYNARON E4600P | $1.7 \times 10^4$ | 0.34 | 88 | 1 | 1 |
| C. Ex. 9 | DYNARON E6100P | $3.9 \times 10^4$ | 0.42 | 89 | 1 | 1 |

Reference Example 2

An ethylene-propylene copolymer resin (content of ethylene units=4.5 wt. %; MFR=90 g/10 min.) (66.7 wt. parts) and an ethylene-propylene copolymer rubber (SPO V0141 manufactured by Sumitomo Chemical Co., Ltd. content of propylene units=27 wt. %; MFR=0.7 g/10 min.) (33.3 wt. parts) were kneaded with a twin-screw kneader at a shear rate of $1.2\times10^3$ sec.$^{-1}$ at 200° C., and a composition ($\eta^*(1)=2.7\times10^3$ poise; n=0.08) was obtained. This composition was cut with a cutter, and pellets were obtained.

Example 7

A thermoplastic elastomer composition was prepared, and a molded article was produced in the same manners as in Example 1 except that the pellets of the composition prepared in Reference Example 2 was used in place of the pellets of the composition prepared in Reference Example 1, and the amount of the hydrogenated diene polymer (DYNARON 1320P) was changed to 66.7 wt. parts. The results of the evaluations of the thermoplastic elastomer composition and molded article are shown in Table 3.

Comparative Example 10

A thermoplastic elastomer composition was prepared, and a molded article was produced in the same manners as in Example 7 except that no hydrogenated diene polymer was used. The results of the evaluations of the thermoplastic elastomer composition and molded article are shown in Table 3.

Comparative Example 11

A thermoplastic elastomer composition was prepared and a molded article was produced in the same manners as in Example 7 except that a hydrogenated styrene-butadiene-styrene block copolymer (KRAYTON G1657X manufactured by SHELL CHEMICAL Co., Ltd. content of styrene units=13 wt. %; hydrogenation degree=99%; $\eta^*(1)=7\times10^3$ poise; n=0.1) (66.7 wt. parts) was used in place of the hydrogenated diene polymer. The results of the evaluations of the thermoplastic elastomer composition and molded article are shown in Table 3.

Comparative Example 12

A thermoplastic elastomer composition was prepared, and a molded article was produced in the same manners as in Example 7 except that a hydrogenated styrene-isoprene-styrene block copolymer (HYBLAR HVS-3 manufactured by KURARAY Co., Ltd. content of styrene units=20 wt. %; hydrogenation degree=99%; $\eta^*(1)=1.3\times10^3$ poise; n=0.63) (25 wt. parts) was used in place of the hydrogenated diene polymer. The results of the evaluations of the thermoplastic elastomer composition and molded article are shown in Table 3.

Comparative Example 13

A thermoplastic elastomer composition was prepared, and a molded article was produced in the same manners as in Example 7 except that an ethylene-propylene random copolymer (SPO V0141 manufactured by Sumitomo Chemical Co., Ltd. content of propylene units=27 wt. %; $\eta^*(1)=5.2\times10^4$ poise; n=0.2) (66.7 wt. parts) was used in place of the hydrogenated diene polymer. The results of the evaluations of the thermoplastic elastomer composition and molded article are shown in Table 3.

Example 8

A composition ($\eta^*(1)=2.3\times10^3$ poise; n=0.08) was prepared in the same manner as in Reference Example 2 except that the amount of the ethylene-propylene copolymer resin was changed to 69 wt. parts, and the amount of the ethylene-propylene copolymer rubber was changed to 31 wt. parts, and then pellets were obtained.

A thermoplastic elastomer composition was prepared and a molded article was produced in the same manners as in Example 1 except that the above obtained pellets (100 wt. parts) were used in place of the pellets obtained in Reference Example 1, and the amount of the hydrogenated diene polymer (DYNARON 1320P) was changed to 54 wt. parts. The results of the evaluations of the thermoplastic elastomer composition and molded article are shown in Table 3.

TABLE 3

| Example No. | Polymer | Thermoplastic elastomer composition $\eta^*(1)$ (poise) | n | Flexibility | Molded article Whitening under 500 g | 1 kg |
|---|---|---|---|---|---|---|
| Ex. 7 | DYNARON 1320P | $5.0 \times 10^3$ | 0.17 | 86 | 4 | 4 |
| C. Ex. 10 | — | $2.7 \times 10^3$ | 0.08 | 92 | 2 | 1 |
| C. Ex. 11 | KRAYTON G1657X | $4.2 \times 10^3$ | 0.10 | 87 | 1 | 1 |
| C. Ex. 12 | HYBLAR HVS-3 | $5.4 \times 10^3$ | 0.13 | 87 | 1 | 1 |
| C. Ex. 13 | SPO V0141 | $6.7 \times 10^3$ | 0.09 | 87 | 1 | 1 |
| Ex. 8 | DYNARON 1320P | $7.3 \times 10^3$ | 0.12 | 88 | 4 | 4 |

What is claimed is:

1. A powered thermoplastic elastomer composition for powder molding comprising:
   100 weight parts, in total, of an ethylene-α-olefin copolymer rubber and polyolefin resin, and
   0.1 to 150 weight parts of at least one hydrogenated diene polymer having a hydrogenation degree of at least 70% selected from the group consisting of hydrogenated conjugated diene polymers and hydrogenated products of random copolymers comprising conjugated dienes and aromatic vinyl compounds in which the content of the aromatic vinyl compound units is 25 wt. % or less, wherein said composition has a complex dynamic viscosity $\eta^*(1)$ of $1.5\times10^5$ poise or less, and a Newtonian viscosity index n of 0.67, wherein the powdered thermoplastic elastomer composition has a particle size which passes through a 24 mesh of the Tyler standard sieve.

2. A method for producing a molded article comprising powder molding a thermoplastic elastomer composition powder as claimed in claim 1.

3. A thermoplastic elastomer composition powder according to claim 1, wherein said ethylene-α-olefin copolymer rubber and said polyolefin resin are present in a weight ratio of between 5:95 and 80:20.

4. A thermoplastic elastomer composition powder according to claim 1, wherein said thermoplastic elastomer composition powder has a particle size which passes through the a 28 mesh of the Tyler standard siev.

* * * * *